United States Patent [19]

Stransky et al.

[11] 4,079,112

[45] Mar. 14, 1978

[54] PRINTING PLATE MATRIX AND METHOD OF MANUFACTURE THEREOF

[75] Inventors: Paul D. Stransky, Thompson, Conn.; John R. Curran, Jr., Providence, R.I.

[73] Assignee: Rogers Corporation, Rogers, Conn.

[21] Appl. No.: 750,272

[22] Filed: Dec. 13, 1976

[51] Int. Cl.[2] .......................... B28B 13/00; B29C 1/14

[52] U.S. Cl. .................................. 264/162; 101/401.1; 249/134; 249/187 R; 264/293; 264/220; 264/321

[58] Field of Search ................... 249/187 R, 138, 140, 249/134; 264/138, 162, 239, 241, 259, 294, 295, 296, 321, 319, 324, 220, 293, 284; 101/401.1, 401.2; 425/177, 195, 385; 29/420, 420.5

[56] References Cited

U.S. PATENT DOCUMENTS 3,658,972 4/1972 Ready et al. ..................... 264/321 X

*Primary Examiner*—J. Howard Flint, Jr.
*Assistant Examiner*—John S. Brown

[57] ABSTRACT

A matrix for plastic letterpress printing plates and the method of formation thereof are presented wherein the matrix material prior to molding is thicker than the desired molded matrix. The "non-printing" areas of the matrix are compressed to at least seventy percent of the density of the compressed "printing areas" in forming the matrix, and the matrix may then be ground to desired thickness to obtain desired heat transfer characteristics.

6 Claims, 2 Drawing Figures

PRINTING PLATE MATRIX AND METHOD OF MANUFACTURE THEREOF

BACKGROUND OF THE INVENTION

The formation of flexographic printing plates by the process of pressing the flexographic plate material into a matrix material in a press is well known. A requirement now exists for relatively rigid plastic letterpress printing plates, and the formation of these plastic letterpress printing plates present several problems not encountered in the formation of flexographic plates. One particular problem area is in the matrix material used to form the plastic letterpress printing plate.

The procedure for the manufacture of plastic letterpress printing plates from plastic resins involves forming a matrix, and then molding the plastic plate material to the matrix. The matrix is made from a fiber reinforced thermosetting resin material known in the art as matrix board. The matrix board is molded to a patterned master plate and cured with heat and pressure to form a mold for the plastic letterpress plates, which are typically formed from thermoplastic material. The molded matrix will have relief portions, i.e. impressions, and flat or dead areas. The relief portions correspond to the raised printing areas which will be obtained on the plastic letterpress printing plates formed from matrix, and the flat or dead areas will correspond to the non-printing areas on the plastic letterpress plates. The relief and flat portions of the matrix will sometimes be referred to herein as "printing" and "non-printing" areas, respectively. The molded matrix is inserted into the metal cavity of an injection molding press, and the thermoplastic resin, such as polypropylene, is injected into the matrix mold at high temperature and pressure. For example, in forming plastic letterpress printing plates from polypropylene thermoplastic material, temperatures in the range of 400° F and pressures in the range of 6000 psi may be encountered.

Some significant problems are encountered in the molding of such thermoplastic letterpress printing plates. The molding pressure is applied by a press ram which injects the thermoplastic molding material against the matrix. One significant problem is that the rate of heat transfer through the matrix is slower than through the metal (usually steel) surface of the injection molding press mold. Thus, the overall cooling rate, and hence the cycle time for plate formation, is a function of the thickness and thermal conductivity of the matrix. Thicker matrix materials increase the cycle time and thus increase the cost of plate making. In addition, the different heat transfer rates through the matrix material and the press plate result in uneven cooling of the opposed surfaces of the plastic letterpress printing plate, and this uneven cooling leads to undesirable warpage of the plastic letterpress plate when the plate is removed from the press.

Attempts have been made to achieve a thin molded matrix simply by reducing the thickness of the starting matrix material, i.e. the unmolded matrix board. However, when matrix thickness is reduced to facilitate heat transfer, there is a significant reduction in densification of the non-printing areas of the matrix board during matrix formation. These low density non-printing areas tend to compress at the pressure levels used in subsequent plate molding, with the result that there is a loss of relief between the printing and non-printing areas. This loss of relief or contrast between the printing and non-printing areas increases the tendency of non-printing areas to pick up ink and to print where printing is not desired.

SUMMARY OF THE INVENTION

The above-discussed and other problems of the prior art are eliminated or substantially reduced by the matrix board for plastic plate formation and the method of formation of matrix board in accordance with the present invention. In the present invention an unmolded matrix board is used which is substantially thicker than the final desired matrix. During the molding process, this substantially thicker matrix board is significantly compressed in the non-printing areas as well as in the printing areas in which the relief patterns are formed. This compression of the non-printing areas results in a densification of the non-printing areas equal to from 65 to 75 percent of the densification of the relief areas. The back side of the matrix board, i.e. the surface opposed to the surface in which the relief impressions are formed, is then ground to a final minimum desired thickness to maximize heat transfer rates, minimize warpage and control thickness uniformity of the molded matrix. The resultant molded matrix is a relatively thin matrix having non-printing areas of a density approximately 65 to 75 percent of the density of the floor areas, i.e. the base of those areas in which the relief impressions have been formed. When this board is used as a matrix for the formation of thermoplastic letterpress printing plates under the high heat and pressure of injection molding, the predensified non-printing areas are free or almost totally free of any further compression or collapse (known as recompression loss), so that there is little or no loss of relief in the matrix and hence little or no loss or reduction of relief in the resulting thermoplastic letterpress printing plates. Consequently, the matrix of the present invention is capable of producing large numbers of high quality plastic printing plates while consistently maintaining the desired relief between the printing and non-printing portions of the printing plate.

Accordingly, one object of the present invention is to provide a novel and improved matrix and method of formation thereof for use in forming plastic letterpress printing plates.

Another object of the present invention is to provide a novel and improved matrix and method of formation thereof for plastic letterpress printing plates wherein compression of the non-printing areas during printing plate formation is eliminated or significantly reduced.

Still another object of the present invention is to provide a novel and improved matrix and method of formation thereof for plastic letterpress printing plates wherein compression of the non-printing areas during plate formation is eliminated or significantly reduced by increasing the density of the non-printing areas to a predetermined value relative to the density of the relief areas.

Still another object of the present invention is to provide a novel and improved matrix and method of formation thereof for plastic letterpress printing plates in which the matrix is ground after molding to achieve desired thickness, minimize warpage and maximize heat transfer.

Other objects and advantages of the present invention will be apparent to and understood by those skilled in the art from the following detailed description and drawings.

DESCRIPTION OF THE PREFERRED EMBODIMENT

Figure 1:
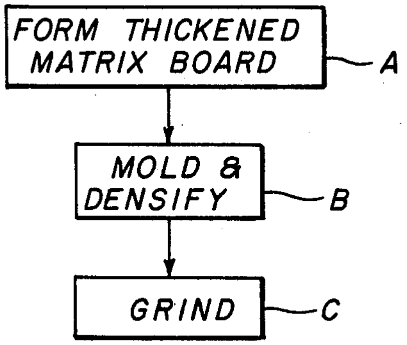
FIG. 1 of the drawing shows a simplified flow diagram of the method of forming a matrix for plastic letterpress printing plates in accordance with the present invention.

Matrix board is manufactured in accordance with standard technology known in the art. Matrix board is typically formed from fiber reinforced phenolic thermosetting resin, and several manufacturers currently offer matrix board commercially. One particularly suitable matrix board is known as R435 available from Rogers Corporation of Rogers, Connecticut.

Matrix board is typically formed in sheets of desired thickness depending on the printing plate application for which the board is to be used. In accordance with the present invention, matrix bord is initially formed from 20 to 30 percent thicker than the thickness of the desired final matrix. Preferably, the board would be approximately 25 percent thicker, and it is of relatively uniform density in its unmolded state. The formation of the initially thickened matrix board of uniform density is indicated as step A in the drawing.

Figure 2:
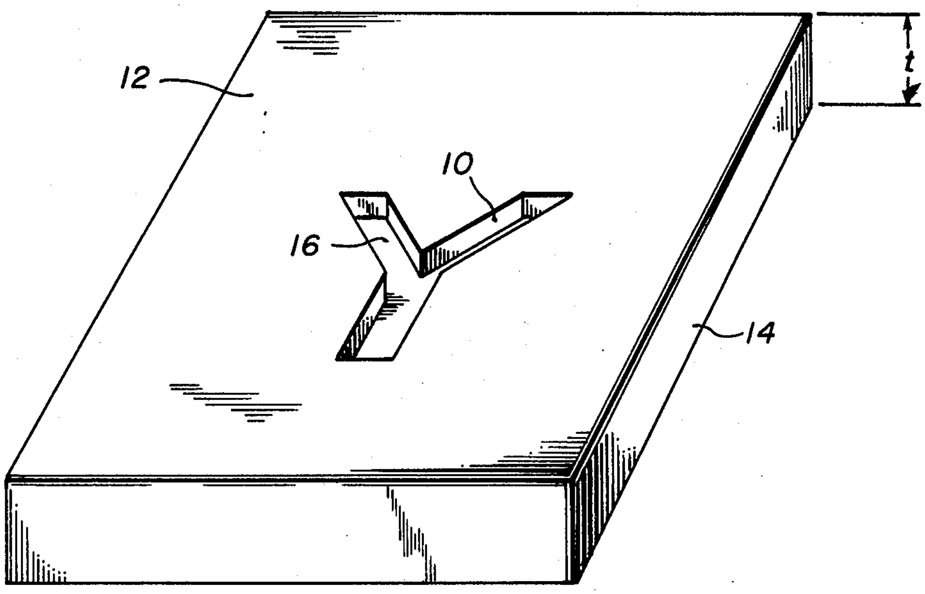
FIG. 2 shows a simplified representation of a matrix with the letter "Y" formed in relief.

This initially thickened board is then placed in a mold and molded under heat and pressure to define relief areas 10 such as the letter "Y" in FIG. 2 (which would correspond to the raised printing areas of a thermoplastic letterpress plate formed with the matrix) and flat upper surface non-relief areas 12 on matrix 14 (which would correspond to non-printing areas in a plastic printing plate formed with the matrix). The molding takes place at temperatures ranging from 300° F to 350° F and pressures ranging from 500 psi to 1000 psi for times ranging from 3 minutes to 10 minutes both to form a relief pattern and to cure the thermosetting resin in the matrix board to form a rigid matrix. In accordance with the present invention, the non-relief (non-printing) areas 12 of the matrix are compressed by the molding master (which may be an engraved magnesium plate or other known suitable master). This compression of the non-printing areas can occur and be produced both by the increased initial thickness of the matrix board and by selective setting of the shims or bearing stops which are used to determine the penetration of the molding master into the matrix board. As will clearly be recognized, the relief areas are significantly compressed by the raised portions of the molding master to form the relief areas. The floor 16 of the relief area (i.e. the thickness of the matrix in the relief areas after compression) will be denser than the matrix material prior to molding, the final density of the floor being a function of the amount of relief molded into the matrix. In accordance with the present invention, the non-relief areas of the matrix are also compressed by the master to achieve a density ranging from a minimum of 65 percent of the density of the floor of the relief areas to a maximum of 75 percent of the density of the floor of the relief areas, with the preferred density of the non-relief areas being 70 percent of the density of the floors of the relief area. Molding and densification are indicated at step B of FIG. 1.

After the matrix has been molded and densified as set forth above to achieve the desired density relationship between the relief and non-relief areas, the back side of the matrix (i.e. the surface opposed to surface 12 in which the relief patterns are formed) is then ground to remove material from the back side. This grinding (indicated in step C of FIG. 1) results in a matrix having a uniform overall thickness dimension "*t*" which may be as small as desired consistent with requirements of mechanical strength of the matrix. When this thin matrix is used for molding thermoplastic letterpress printing plates, heat transfer from the printing plate material through the matrix is enhanced so that it approaches the rate of heat transfer through the press plate used to press the printing plate material into the matrix, so that the problem of warpage of the printing plates is eliminated or reduced. In order for this grinding of the back side of the matrix to be accomplished effectively to produce a uniform final thickness, it is necessary to support the relief areas 10 of the molded matrix to prevent them from deflecting during the grinding operation. Such support can be provided by any suitable means, such as the use of a rubber support blanket placed against the molded face of the matrix during grinding or, preferably, by grinding the rear surface prior to removal of the matrix from the original metal engraving or other master from which the matrix is formed, thereby permitting the master to provide support for the matrix during the grinding operation.

Testing has shown that matrices formed in accordance with the present invention show complete or almost complete absence of any further compression of the non-relief or non-printing areas when used for molding thermoplastic letterpress printing plates under heat and pressure. In other words, matrices in accordance with the present invention retain their dimensional stability between the relief and non-relief areas of the matrices so that printing plates formed with these matrices uniformly and consistently have the desired relief of the non-printing areas relative to the printing areas.

Seven examples of the present invention are presented below. In each of these examples, the unmolded matrix board was R435 matrix material obtained from Rogers Corporation, Rogers, Connecticut. In examples 1–4 the unmolded matrix material was about 0.100 inches thick, and it was cut into segments measuring 10 inches by 10 inches. For each of examples 1–4 the matrix material was placed in a mold and molded against the same master plate at 310° F and 1000 psi for 3 minutes to form relief patterns of 0.030 inches. From one example to the other in examples 1–4 the variable was penetration of the master into the matrix material to compress and reduce the overall thickness "*t*" of the matrix with a uniform relief of 0.030 inches. The penetration (i.e. reduction in thickness of the matrix) was 0.019 inches in example 1, was decreased to 0.011 inches in example 2, was decreased to 0.008 inches in example 3 and was decreased to 0.005 inches in example 4. As will be understood, the relief (i.e. the dimension between surface 12 and floor 16 was the same in all cases (0.030 inches), but the thickness "*t*" would be reduced and the density of the non-printing areas increased with increased penetration. After the matrix was formed in each example, it was subjected to a laboratory test to simulate injection molding. Each of the samples was placed in a platten press and was squeezed at 400° F and 1000 psi for 1 minute. The following tabulation of results was obtained:

| EXAMPLE | DENSITY PERCENTAGE[1] | LOSS BY RECOMPRESSION[2] (in mils) |
|---|---|---|
| 1 | 75.9 | 0 |
| 2 | 69.2 | 1 |
| 3 | 67.3 | 2 |
| 4 | 65.2 | 3 |

[1]Relationship of density of non-recessed area of matrix to density of floor of recessed area.
[2]Dimensional change (in mils) of relief resulting from recompression of non-relief areas.

In examples 5–7 the unmolded matrix material (Rogers R435) was 0.100 inches thick and it was cut into 24⅝ inch by 15⅝ inch segments. For each example the matrix was molded against a pattern plate at 320° F at 750 psi for 3 minutes. Bearers were set so that in all three examples penetration was such that the non-printing areas of the matrix were compressed to 75.4 percent of the ultimate density with relief being 0.030 inches. The matrix of each of examples 5–7 was then ground to a total thickness "*t*" of 0.073 inches. The samples were then placed in an injection molding machine and polypropylene thermoplastic letterpress printing plates were molded against each matrix with the polypropylene injected at temperature of 400° F and pressure of 6000 psi for 8 seconds. The following results were obtained:

| EXAMPLE | DENSITY PERCENTAGE[1] | LOSS BY RECOMPRESSION[2] (in mils) |
|---|---|---|
| 5 | 75.4 | 0 |
| 6 | 75.4 | 1 |
| 7 | 75.4 | 0 |

[1]Relationship of density of non-recessed area of matrix to density of floor of recessed area.
[2]Dimensional change (in mils) of relief resulting from recompression of non-relief areas.

As can be seen from the foregoing tables for examples 1–7, there is little or no further compression of the non-relief areas when the non-relief areas are initially compressed to a density of from 65 to 75 percent of the density of the floors of the relief areas. Particularly, a density percentage of 70 percent or more results in virtually no recompression loss. Thus, matrices made in accordance with the present invention retain their dimensional stability with the result that printing plates made from those matrices can be expected to show consistent and reliable relief patterning.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. The method of forming a matrix for use in molding thermoplastic letterpress printing plates, including the steps of:

compressing a predetermined part of a matrix board of relatively uniform initial density in accordance with a pattern to form a relief pattern in a surface of the matrix board having a compressed floor of greater density than said initial density; and compressing the remainder of said matrix board to a density equal to from about 65 percent to about 75 percent of the density of said floor.

2. The method of forming a matrix as in claim 1, including the step of:

grinding the surface of said matrix opposed to said relief pattern to form a matrix of desired thickness.

3. The method of forming a matrix as in claim 2, including:

supporting said relief pattern of said matrix during grinding.

4. The method of forming a matrix as in claim 1 wherein said step of compressing the remainder of the matrix board includes:

compressing the remainder of the matrix board to about 70 percent of the density of said floor.

5. A matrix for use in forming thermoplastic letterpress printing plates including:

a molded unit of thermosetting resin, formed from a matrix material of relatively uniform initial density;

a relief area in said molded unit having a floor of density greater than said initial density; and a non-relief area in said molded unit having a density of from about 65 percent to about 75 percent of the density of said floor of the relief area.

6. A matrix as in claim 5 wherein:

said non-relief area has a density of about 70 percent of the density of said floor of the relief area.

* * * * *